United States Patent [19]
Williamson

[11] 4,079,316
[45] Mar. 14, 1978

[54] SLIDING TONE COMMAND RECEIVER SYSTEM

[75] Inventor: P. Roger Williamson, Smithfield, Utah

[73] Assignee: The United States of America as represented by the Secretary of the Navy, Washington, D.C.

[21] Appl. No.: 723,001

[22] Filed: Sep. 13, 1976

[51] Int. Cl.² .................. H04B 7/00; H04B 15/00
[52] U.S. Cl. ............................. 325/37; 325/65; 343/225
[58] Field of Search ............ 325/30, 37, 64, 45, 325/65, 344, 392, 466; 343/225, 228; 340/171 R

[56] References Cited

U.S. PATENT DOCUMENTS

| | | | |
|---|---|---|---|
| 3,484,693 | 12/1969 | Fong | 325/30 |
| 3,486,118 | 12/1969 | Sanders et al. | 325/64 |
| 3,493,865 | 2/1970 | Miller | 325/65 |
| 3,530,472 | 9/1970 | Fukata et al. | 343/228 |

Primary Examiner—Robert L. Griffin
Assistant Examiner—Marc E. Bookbinder
Attorney, Agent, or Firm—Richard S. Sciascia; Paul N. Critchlow

[57] ABSTRACT

The system employs a sliding tone FM signal to command a remote device such as a balloon; for example, to fire a squib for balloon release. The tone is a slowly-changing, progressively-increasing signal received and detected by discriminator circuitry for application to a phase-locked loop circuit. Comparison of the loop output with a reference voltage provides a release signal when the reference voltage is exceeded. Since the reference voltage is determined by the loop voltage produced by a predetermined command tone, the generation of the release signal is dependent upon the presence of that particular command frequency. A unijunction transistor and an SCR then function as a relay to close a battery-squib circuit. The slowly-changing, sliding tone, as well as the time constant of the phase locked loop circuit, provide a high degree of security from accidental commands and also permit a wide variation in component tolerance including temperature tolerance. Simplicity and low cost permit the receiver to be considered expendable.

5 Claims, 3 Drawing Figures

SLIDING TONE COMMAND RECEIVER SYSTEM

BACKGROUND OF THE INVENTION

The present invention relates to remote control systems and, in particular, to systems in which the remotely controlled device is expendable.

Primarily, the present system is intended for use as a light weight, expendable balloon flight termination command receiver, although other potential uses are contemplated particularly in situations requiring high sensitivity, temperature tolerance, low power, low cost, low false triggering in high noise environments and, as an added bonus or adjunct to these characteristics, the capability of obtaining accurate range information for the device being controlled.

For some time a need has existed for a command receiver that can be used on balloon flights where recovery is not practical even though highly sensitive and reliable balloon control is required. Balloon flights present some special and quite difficult problems including, in addition to the need for expendability, the fact that the balloons frequently are operated at extreme altitudes and, at times, in a very high noise environment. Consequently, the command receiver must be highly sensitive and it also should provide a high degree of noise immunity to avoid accidental release. Also, because the receiver components are exposed to extremely low temperatures, they are highly susceptible to temperature drift which can prevent command reception or degrade the sensitivity and reliability.

In the past units used for these purposes mostly employed single or multiple constant tones decoded with tuned or RC circuits or, at times, with tone reed relays. These circuits all suffer from low sensitivity to false triggering comparisons and also are susceptible to drift with temperature. They do have one advantage in that a number of different commands can be sent on a single radio channel. However, as will become apparent, the present command receiver easily can be provided with additional circuitry which should make available as many, if not more, such channels.

Other serious disadvantages of the prior art techniques include such factors as their relatively high cost, power consumption and, significantly, the need for tuning during assembly. It also is quite desirable to provide a system with the capability of ranging or distance measuring and, in contrast to some of the prior art techniques, the present system readily adapts to this function and it therefore is provided as an added bonus to the command reception capability.

SUMMARY OF THE INVENTION

The present invention is characterized by the generation and transmission of a radio signal command consisting of a slowly changing tone which begins at an audio frequency $f_0$ and increases slowly, preferably with a time duration of about 10 seconds, to a frequency $f_1$ where it may remain for a period of time such as about 4 seconds. The sliding tone technique provides a high degree of security from accidental command accompanied by a component tolerance to relatively wide temperature variation. The command receiver itself utilizes a phase locked loop decoder or its equivalent coupled to an operational amplifier serving as a level detector that provides the command signal only when a predetermined command tone is received and processed by the phase locked loop. Functionally, the tracking and capture range of the detector is not captured unless a lower frequency tone first is sent and captured and only then is the tone increased relatively slowly to the triggering level. False triggering does not occur since the phase locked loop time constant is long compared to that of the noise components. Other features of the invention include the specific component arrangement which contributes to the low cost and the simplicity which, in turn, permit the command receiver to be considered expendable.

The objects of the invention should be readily apparent from the foregoing description. In addition to the low cost and simplicity, they include the sensitivity, freedom from false triggering, ranging capability and, as will be described, the capability of the receiver to provide by telemetering information pertinent to its operating condition.

BRIEF DESCRIPTION OF THE DRAWINGS

The present invention is illustrated in the accompanying drawings of which.

DETAILED DESCRIPTION OF THE INVENTION

Figure 1:
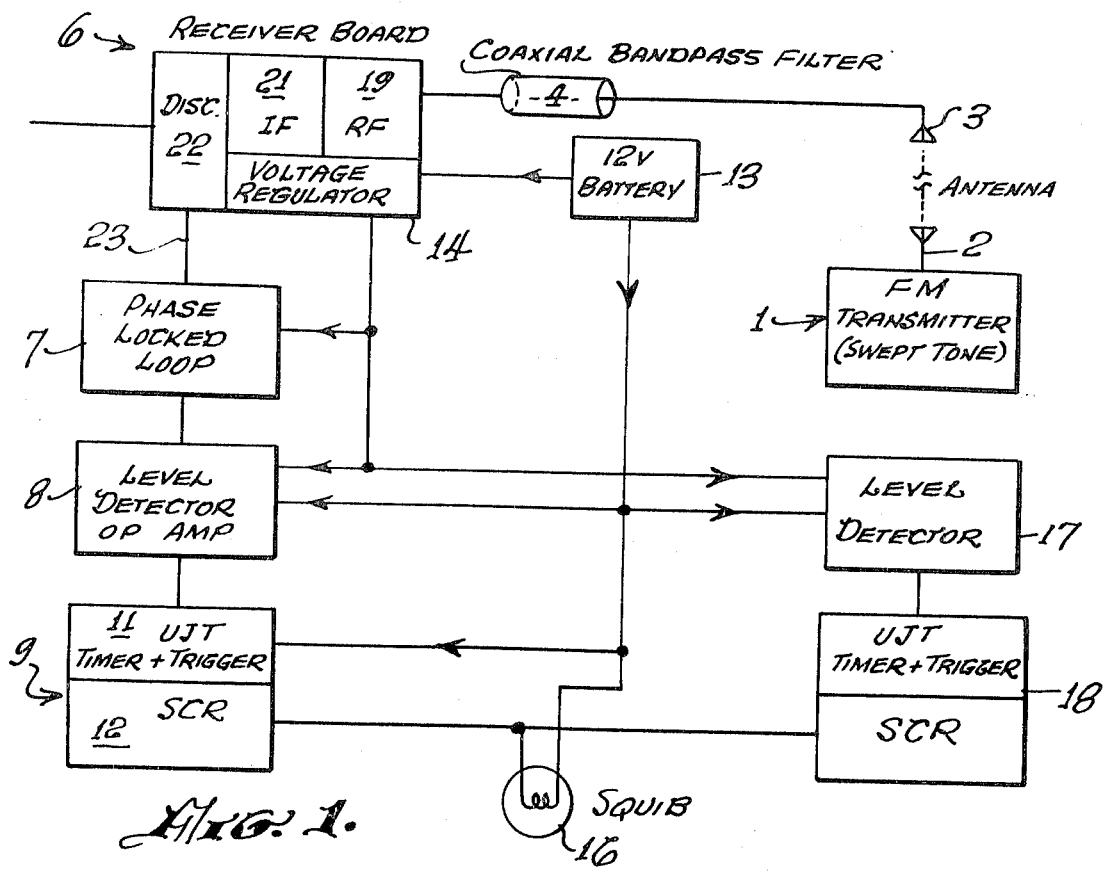
FIG. 1 is a block diagram of the system.

The present system will be described primarily with reference to its presently-contemplated application which is one of remotely actuating a balloon release mechanism such as a squib, to terminate the balloon flight. With reference to the block diagram of FIG. 1, the system can be considered as including a ground station 1 identified in the drawing as an "FM transmitter" having an antenna 2 for transmitting a command signal to a command receiver which obviously is carried by the balloon itself. The transmitted signal is received by an antenna 3 for delivery through a band pass filter 4 to certain signal processing and detecting components. Generally considered, these components include a receiver board 6, a phase locked loop circuit 7, a level detector 8 and a relay circuit 9 which, as indicated in FIG. 1, includes a unijunction transistor section 11 and an SCR section 12. A 12 volt battery 13 supplies the operating power for the components and, as shown, the battery power is applied through a closely controlled voltage regulator 14. More specifically, voltage regulator 14 provides a highly regulated 9.2 volt power supply for receiver board 6 as well as the phase locked loop 7 and level detector 8. As will be described, the 9.2 volt level is used as a reference voltage level in detector 8. Level detector 8 responds to the balloon command tone to operate a relay formed of the UJT and the SCR which, in turn, enables battery power to be applied to a squib 16 for terminating the flight or achieving any other desired purpose. Obviously, other devices can be substituted for the squib and, in fact, the system on a whole can be used for a variety of purposes other than for airborne objects.

Blocks 17 and 18 provide another level detector and SCR relay presently used as a fail-safe device to guarantee flight termination even when the battery power supply is lost or reduced to an inoperative level. Again, this 'low-battery' circuit will be considered in some detail.

One of the features of the present invention is that the radio signal command transmitted from ground station 1 consists of a slowly changing tone which, for example, may begin at an audio frequency $f_0$ and increase slowly over a time period of about 10 seconds to a frequency $f_1$ where it remains for a period of time of about 4 seconds. In other words, the command signal is an FM modulated signal containing a squib command frequency and, preferably, this squib command is sent by slowly sweeping an audio tone modulation from 300–400 Hz over a time period of about 10 seconds. Such a transmission also is known as a 'sliding tone' technique which provides a number of advantages including a high degree of security from accidental commands accompanied by considerable component tolerance relative to temperature variation. In actual practice, the signal can have a center frequency of 138.54 MHz which is a coordinated frequency frequently used in both command and voice operations. The FM modulation can be with a plus or minus 5 kHz deviation.

The ground station itself can be provided in any desired manner. In its present implementation, a GE Mastr II mobile transceiver is used which is capable of radiating about 100 watts of RF power. The transceiver is preferred since, as will be described, various telemetered signals are to be received from the command receiver pertinent to the operating conditions of the receiver. Preferably, a square wave generator also is incorporated in the mobile ground station to transmit to the receiver a square wave used for ranging or distance measurement purposes and the ground station consequently may be provided with an automatic ranging circuit. Transmitting antenna 2 of the ground station can be provided by various types of omni-directional antennas. The power output of the transmitter and the sensitivity of the receiver seem adequate to eliminate any need for a directional transmitter antenna. Power for the entire ground-based system preferably is provided by a GEL/CELL 12 volt 20 Ah battery so as to render the ground station portable. Since this cell is a sealed lead-acid battery, it easily can be transported without danger of electrolyte spillage.

Considering the receiver components in greater detail, antenna 3 can be constructed in relatively simple form from a 300 cm piece of RG-188 coaxial cable which is stripped ¼ wave length (54.2 cm) from one end. A braided shield 54.2 cm long is soldered to the coax shield so that a vertical dipole antenna results. Receiver board component 6 is a commercially-available component identified as UCSD Special P700 Receiver Board, Plectron Corporation, Overton, Neb. As shown in FIG. 1, this board contains an RF section 19, an IF section 21, a discriminator circuitry 22 and the previously-identified voltage regulator 14. In the commercial form, the output from discriminator 22 normally is applied to a preamplifier before the tone detection circuitry. However, in the present implementation, the preamplifier can be eliminated thereby reducing cost and power needs, as well as increasing reliability by virtue of fewer parts. Operationally considered, receiver board 6 examines the transmitted command signal and, after mixing and heterdyning, the discriminator detects any shifts in the transmitted signal away from its center frequency. Its output is an AC signal of constant amplitude with frequency proportional to the shift. The actual circuitry used by the discriminator and in the previous RF and IF sections is entirely conventional and should require no specific description. Generally, the commercial P700 receiver board includes an RF amplifier, a first mixer, an isolation amplifier, a second mixer, a second IF amplifier and a limiter which applies the signal directly to the discriminator. First and second oscillators are used for the mixers and, as already indicated, the board also includes the voltage regulator which produces the 9.2 reference voltage (VR).

Figure 2:
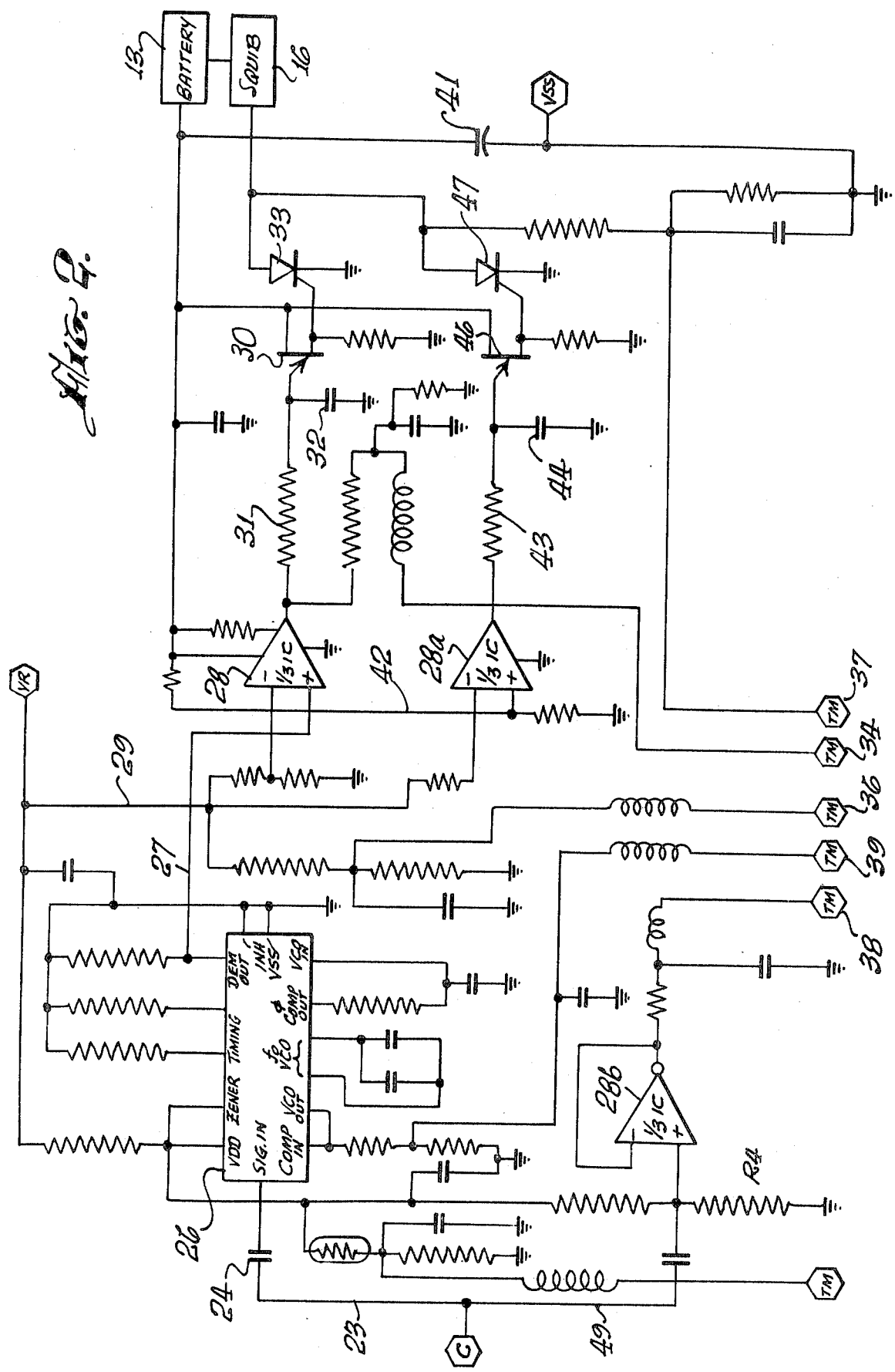
FIG. 2 is a circuit diagram of a portion of the command receiver.

The circuit diagram of FIG. 2 shows the circuitry contained in blocks 7, 8 and 9 of FIG. 1, as well as its blocks 17 and 18 which, as indicated, provide a fail-safe mechanism for achieving release when the battery power is lost. As shown in FIG. 2, the output of discriminator 22 is applied to phase locked loop 7 through conductor 23 which includes a blocking capacitor 24 to eliminate DC. The phase locked loop component is conventional as are all of the other components used in the FIG. 2 circuitry. Consequently, the ensuing description principally will be with regard to the manner in which these conventional components are operated to achieve the desired results and, except as may be necessary for descriptive purposes, the various circuit details as well as their values will not be considered. Obviously, the configuration of the circuitry in so far as such details are involved can be achieved in a variety of ways which will be recognized by those familiar with this art.

Phase locked loop 7 includes an integrated circuit (IC) component 26 and its associated circuitry. Generally considered, this circuit is a commercially-available phase locked loop (PPL) component which, in the present system, is operated in its standard phase comparison mode. A suitable component is the RCA-CD 4046A COS/MOS Micropower Phase-Locked Loop described in RCA Digital Integrated Circuits Application Note ICAN-6101. More specifically, this circuit consists of a phase comparator section and a voltage controlled oscillator section plus timing and ancillary circuitry all of which are either shown or identified in FIG. 2 by appropriate legends. The output of the phase comparator is used to slave the voltage controlled oscillator to the incoming signal which, of course, is the discriminator output derived through conductor 23. The output of the phase locked loop itself is applied to level detector 8 through a conductor 27 and, as will be recognized, the output is a DC signal having amplitude value proportional to the input frequencies derived from discriminator 22. As the incoming signal frequency derived from the discriminator shifts due to the swept tone feature, the voltage controlled oscillator frequency of the PLL changes and follows the signal so that its output carried by conductor 27 is a progressively increasing DC signal sequentially representing the progressively increasing frequencies detected and applied to the PLL by discriminator 22.

As already indicated, the PLL precisely is operated in the standard phase comparison mode. More precisely it is operated in the so-called Phase P Comparator C-I mode to take advantage of the very high noise immunity that can be obtained with the phase locked technique. This mode of operation essentially prevents false triggering when no carrier signal is present and it permits a maximum range of operation with reliable triggering. The tracking range and capture range of the PLL are adjustable and are chosen to assure that a tone which will trigger the subsequent level detector cannot be captured unless a lower frequency tone first is sent and captured. Also, triggering cannot be achieved unless the tone is slowly swept over a wide range up to the triggering level. Since the squib command firing tone is slowly swept over a wide range, small changes in the PLL because of temperature or voltage-induced drifts will not affect the reliability of the circuit operation. False triggering does not occur since the PLL time constants are very long compared to the noise appearing at the discriminator output.

Level detector block 8 (FIG. 1) essentially is a comparator provided by an integrated-circuit operational amplifier 28. However, as may be noted, this component actually is one-third of triple operational amplifier integrated circuit with the other portions of the amplifier being used for other purposes to be described. This feature minimizes component requirements and reduces cost. Functionally considered, operational amplifier 28 compares a reference voltage derived from voltage regulator 14 with the DC output level of the phase locked loop. The voltage regulator provides the 9.2 reference level voltage through conductor 29, while the PLL output is provided through the previously mentioned conductor 27. When the output of the PLL reaches a fixed fraction of the 9.2 level of the voltage regulator, the detector is tripped to initiate the command release signal for squib 16. As shown, the output of level detector 28 normally is near ground since its operational amplifier is operated between ground and the battery supply voltage. When the output goes high, an RC circuit consisting of resistor 31 and capacitor 32 begins charging and continues charging until a particular trigger level is reached, normally within a period of a few seconds. This trigger level is a level needed to activate unijunction transistor 30 which is part of the relay circuit shown in block 9 of FIG. 1. Such a circuit will be recognized as being quite common and it provides a good pulse necessary to fire the following stage provided by SCR 33. Since SCR 33 is connected to ground, a circuit from battery 13 through squib 16 and SCR 33 to ground is closed. Consequently, the squib is fired to terminate the balloon flight.

If desired, a voltage divider monitor circuit can be connected to the squib and to the SCR so that the firing of the squib can be telemetered on an appropriate subcarrier to the ground station. The telemeter terminal for this purpose is identified in FIG. 2 by numeral 34. As will be recognized, an appropriate subcarrier, not indicated in FIG. 2, is required for telemetering. Other telemetering terminals used for the present command receiver are terminal 36 which provides VR information to the ground station and terminal 37 that permits the condition of the battery to be constantly monitored. The other terminals 38 and 39 are employed for purposes to be described.

Considering the operation of the device to the extent to which it has been described, it first is to be recalled that the system utilizes the so-called sliding tone technique in which the transmitted carrier is modulated by a progressively-increasing audio tone modulation (300–400 Hz) over a time period of about 10 seconds. Obviously, the command tone is within this frequency range and can be considered as being a tone of 350 Hz. This sliding tone modulated signal is received and processed through the receiver board to produce a demodulated discriminator output which again is a progressively increasing alternating current corresponding sequentially to the transmitted frequency modulation. The discriminator output then is applied to the PLL to produce a progressively increasing DC voltage as a demodulated output. When the PLL input frequency reaches about 350 Hz, which is the command tone, the demodulated output of the phase comparator is high enough to trip level detector 28 which, as stated, is a comparator for producing an output when the demodulated output equals or exceeds the reference level derived from the 9.2 regulated voltage. The detector output then charges the RC circuit until the unijunction transistor trigger level is reached and, most suitably, the time period for reaching such a level is a few seconds duration. As a result, noise spikes or bursts such as might be sufficient to trigger the unijunction transistor normally are excluded because the time period of the noise is insufficient in length to charge the RC circuit. Further, as is known, the PLL has a very high noise immunity obtained through its phase locked technique so that, again, false triggering is eliminated. The PLL elimination is due primarily to the fact that the PLL time constants are very long compared to the noise appearing at the discriminator output. In practice, the band width of the PLL can be adjusted prior to the flight so as to match and accomodate the noise conditions that are expected. In other words, the tracking time constant of the PLL can be regulated to prevent false triggering and, as indicated, the longer the time constants of the PLL, the greater the noise elimination capability. A tracking period within a range of 0.5–10 seconds can be used.

Figure 3:
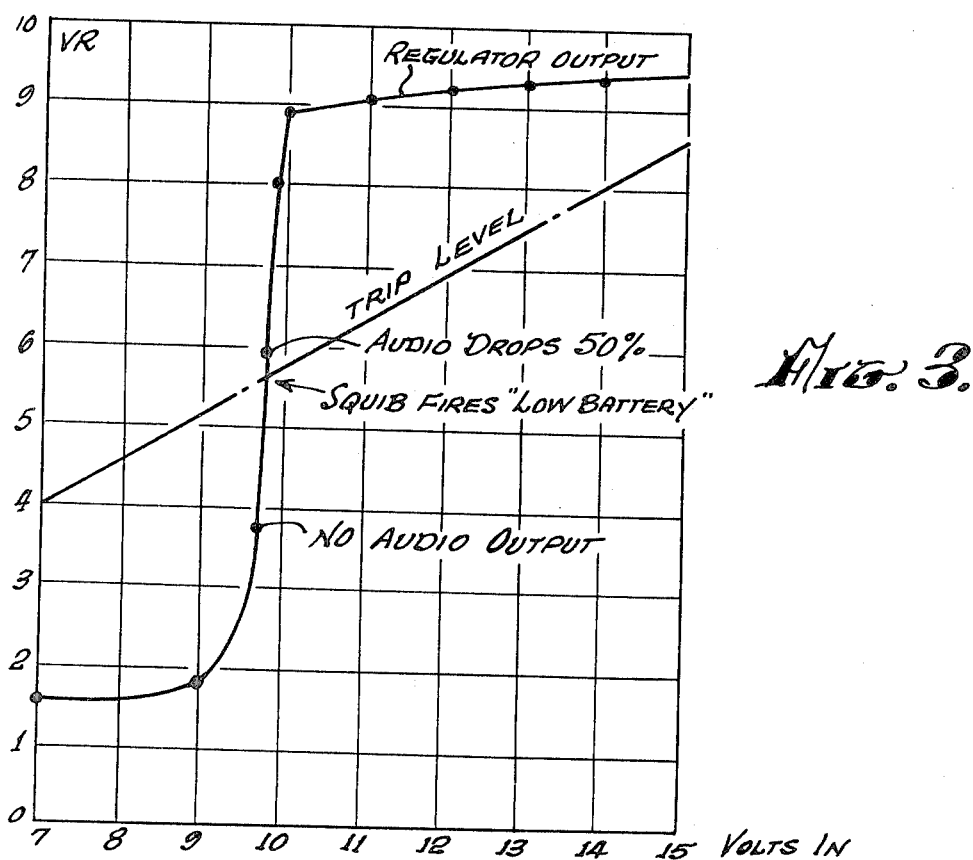
FIG. 3 is a plot showing the operation of a so-called 'low battery' arrangement used to fire the squib when battery power is lost.

Another feature of the present invention involves the previously mentioned battery power fail-safe circuit which, for certain applications, may be highly desirable in view of the fact that battery failures always are a possible source of command failure. The present circuitry utilizes a second operational amplifier identified by numeral 28a to fire the squib if the battery voltage decreases to the point where the command receiver is inoperative. Thus, if the battery voltage decreases to a level which is insufficient to operate the receiver, a special battery detector circuit then will fire the squib to terminate the flight. For this purpose, a large capacitor 41 is coupled across the battery to provide a pulse of several amperes to fire the squib without additional current being drawn from the battery. Thus, when the battery is cold or if a high internal resistance occurs from a failure, the squib still can be fired solely with the energy stored in the capacitor. As shown, operational amplifier 28 compares the battery voltage in line 42 with the voltage regulator level in line 29. When the regulator voltage drops sufficiently, operational amplifier 28a commences charging its RC circuit which is provided by resistor 43 and capacitor 44, and, when the charge reaches a particular level, it trips a unijunction transistor 46 to fire a second SCR 47 to close a circuit through the SCR to ground and fire the squib. FIG. 3 is provided to illustrate the operation of the 'low-battery' circuit. As indicated, the VR drops very rapidly relative to the battery voltage and this drop can be compared with the battery in the level detector to initiate the firing at any desired point.

The present system also is capable of providing range or distance measurements. As shown, the output of discriminator 22 is applied to operational amplifier 28b through conductor 49 and the amplified output then applied to telemetering terminal 38 for retransmission to the ground station. In this sense, the command receiver is acting as a transponder. Opamp 28b is one-third of the triple opamp used in the system with the other thirds used for command release and 'low-battery.' The retransmitted audio output can be viewed at ground with an oscilloscope and this information used for several purposes. Primarily, as indicated, it is used for ranging. Also, from experience, it has been found that the circuit quality, testing and confidence level all are measurably improved by viewing the audio circuit. Preferably, ranging is achieved by transmitting from the ground station a square wave which is detected by the discriminator and sent back to gro nd on a high frequency subcarrier. By measuring the time delay between the leading edge of the square wave that is transmitted and the returning square wave, the slant range to the balloon can be determined providing the inherent time delay in the cicuit is known. The inherent time delay is measured before launch when the slant range is known. The accuracy of this technique is considered to be much better than plus or minus 10nm although sufficient experience as yet has not been obtained to estimate its true accuracy limits.

In general, it is believed that the operation of the system should be clear from the foregoing description. Its principal functional advantages are due first to the use of the slowly changing sliding tone technique which because of the time constants involved provides the desired security and noise-immunity particularly when the received signal is processed through the combination of the PLL and the operational amplifier. Further, the slow change of the sliding tone also allows a wide variation in component tolerance which is a significant advantage in high altitude operations. Also, in balloon operations or the like it must be recognized that recovery of the command receiver is not practical so that the cost of production and testing should be as low as possible. The present configuration achieves this end by the use of a minimum number of relatively low-cost components. Finally, the light weight of the device accommodates airborne operations such as the balloon control.

Obviously many modifications and variations of the present invention are possible in the light of the above teachings. It is therefore to be understood that within the scope of the appended claims the invention may be practiced otherwise than as specifically described.

I claim:

1. A sliding time command receiver system comprising:
    means for transmitting a constant amplitude audio tone of progressively and slowly changing frequencies covering a particular frequency range containing a command tone frequency, and
    transmission receiver means comprising:
        a power source,
        power-actuated command-responsive means,
        tuned receiver means for said transmission,
        discriminator circuitry having an input coupled to said receiver means and an output of progressively and slowly-changing frequencies conforming with said progressively changing frequency transmission,
        phase locked loop circuitry having an input coupled to said discriminator means for tracking its output and producing an output of progressively changing voltages corresponding in values to its input frequencies,
        regulator means providing a fixed voltage output,
        level detector means coupled to said regulator and loop outputs for comparatively producing a detector output when the loop output exceeds said fixed voltage output,
        normally open circuit means conductively coupling said power source to said command-responsive means, and
        said
        relay means for closing said normally open circuit means when said fixed voltage is exceeded whereby said command-responsive means is activated,
        said relay means including an RC circuit couled to aid detector output for closing said normally open circuit means only when charged to a particular level by said detector output,
        said level detector output being initiated by saia command tone frequency and being continued by voltage values exceeding said fixed voltage value whereby activation of said command-responsive means is dependent upon the time period required for the loop circuit to produce a detector output sufficient to charge said RC circuit to said level, said time period being of sufficient length to effectively minimize undesired activation due to noise.

2. The system of claim 1 wherein:
    said normally open circuit means includes a silicon controlled rectifier (SCR) having an output coupled to said power souce, and
    said relay means includes an unijunction transistor (UJT) coupled between said RC circuit and said SCR,
    said UJT triggering said SCR for activating said command responsive means when said RC circuit is charged to said particular level.

3. The system of claim 1 wherein said loop circuit has its frequency capture range adjusted to provide a loop circuit tracking time constant of sufficient length relative to noise present in said discriminator output to provide a high degree of noise immunity, said command time frequency being outside of said capture range whereby actuation of the command-responsive means requires as a condition precedent a progression of the loop input frequencies through the capture range to said outside command tone frequency.

4. The system of claim 3 wherein said transmitted frequencies provide a slowly and progressively increasing sliding tone.

5. The system of claim 3 wherein said transmitted sliding tone has a frequency range of about 100 Hz progressively increased through the range over a time span of about 0.5–10 seconds.

* * * * *